United States Patent

Drinkard, Jr. et al.

[11] Patent Number: 5,912,402
[45] Date of Patent: Jun. 15, 1999

[54] METALLURGICAL DUST RECYCLE PROCESS

[75] Inventors: William F. Drinkard, Jr., Charlotte; Hans J. Woerner, Mt. Pleasant, both of N.C.

[73] Assignee: Drinkard Metalox, Inc., Charlotte, N.C.

[21] Appl. No.: 08/608,726

[22] Filed: Feb. 29, 1996

Related U.S. Application Data

[60] Provisional application No. 60/005,991, Oct. 30, 1995.

[51] Int. Cl.$^6$ ........................................................ C22B 3/00
[52] U.S. Cl. ........................... 75/743; 75/711; 75/718; 75/744; 423/27; 423/34; 423/109; 423/143
[58] Field of Search ........................... 75/711, 718, 743, 75/744; 423/27, 34, 109, 143, 150.1

[56] References Cited

U.S. PATENT DOCUMENTS

| | | | |
|---|---|---|---|
| 3,330,648 | 7/1967 | Vian-Ortuno | 75/101 |
| 3,849,121 | 11/1974 | Burrows | 75/103 |
| 3,888,748 | 6/1975 | Brennecke | 204/108 |
| 3,965,239 | 6/1976 | Posel | 423/34 |
| 4,038,361 | 7/1977 | Posel | 423/34 |
| 4,128,617 | 12/1978 | DeGuire | 423/106 |
| 4,189,461 | 2/1980 | Lueders | 423/27 |
| 4,332,777 | 6/1982 | Pazdej | 423/98 |
| 4,670,051 | 6/1987 | Schneider | 75/101 R |
| 5,208,004 | 5/1993 | Myerson | 423/622 |
| 5,236,492 | 8/1993 | Shaw | 75/744 |
| 5,425,800 | 6/1995 | Buter | 75/744 |
| 5,570,469 | 10/1996 | Soderstrom et al. | 588/18 |

FOREIGN PATENT DOCUMENTS

| | | | |
|---|---|---|---|
| 1510676 | 5/1978 | United Kingdom | B01D 11/02 |

*Primary Examiner*—Patrick Ryan
*Assistant Examiner*—M. Alexandra Elve
*Attorney, Agent, or Firm*—Dougherty & Associates

[57] ABSTRACT

A treatment of metallurgical dust and recovery of valuable chemical commodities, comprising the steps of: leaching salts from the dust with water to create a washed EAF dust; reacting the washed EAF dust in a nitric acid solution resulting in a nearly complete dissolution of the zinc, cadmium, copper, magnesium, calcium, manganese and lead from a filtrate; removing iron from the filtrate by raising pH in the system with basic zinc carbonate; removing cadmium, copper and lead in an electrolytic cell, where copper and cadmium are collected at the cathode, and lead is collected at the anode; evaporating and decomposing the filtrate to obtain metal oxides and anhydrous calcium nitrate; leaching the solid residue with water to separate calcium nitrate in a marketable form; removing the zinc from the magnesium and manganese by leaching the residue with an amine solution; stripping the filtrate of ammonium carbonate to yield zinc precipitated as a zinc oxycarbonate; dividing the zinc oxycarbonate into a first stream and a second stream by reacting the zinc complex with acid to produce a zinc product, the first stream serving as a pH adjuster to precipitate iron, the second stream preparing highly pure zinc products for sale; and, separating a residue containing magnesium and manganese by dissolving magnesium in acid, whereby liquid filtrate contains marketable magnesium nitrate or sulfate. The nitric gases given off during the steps are recycled to nitric acid by a nitric recycle.

43 Claims, 4 Drawing Sheets

EAF DUST FLOWSHEET WITH ALL PRODUCTS GOING TO MARKET OR ARE RECYCLED

EAF DUST FLOWSHEET WITH ALL PRODUCTS GOING TO MARKET OR ARE RECYCLED

METALLURGICAL DUST RECYCLE PROCESS

This application claims benefit of provisional application Ser. No. 60/005,991 filed Oct. 30, 1995.

FIELD OF THE INVENTION

The present invention relates to a method and apparatus for the economically processing of Metallurgical Dust, such as Electric Arc Furnace Dust (hereinafter EAF dust [EPA hazardous waste No. K061]) into marketable chemicals. EAF dust, which is currently treated as hazardous waste, can now be considered as a potential raw material for the recovery of the metal values contained therein as metals, inorganic chemicals, and as a potential raw material source.

BACKGROUND OF THE INVENTION

The manufacture of steel using an electric arc furnace (EAF) is a highly advantageous process in the modern steel industry. A drawback in the EAF manufacture of steel is the production of EAF dust waste by-products. The EAF dust is generated during the steel making process by a variety of mechanisms, including droplet ejection from the turbulent melt and vaporization. The vaporization mechanism is primarily responsible for the relatively high proportion of the non-ferrous metals in the dust such as zinc, lead and cadmium, which are vapors at a temperature of about 1600° centigrade (2,912° fahrenheit) in the EAF hearth. The droplets and vapors of vaporized non-ferrous metals are carried in the exhaust gas stream from the furnace along with mechanically entrained iron oxides, lime, etc. The vaporized metals condense as oxides and ferrites and are collected downstream in a baghouse and/or electrostatic precipitator. The production of 1 ton of steel will generate approximately 34 pounds (15.4 kg) of EAF dust as a by-product.

The rapid growth of the EAF steel process has made EAF dust one of the fastest growing and largest environmental problems worldwide. At present, there are approximately 600,000 metric tons of this hazardous waste generated annually in the USA and an additional 600,000 metric tons generated annually in the rest of the world. EAF produced steel is currently forty percent (40%) of total US steel production. It is expected to become the major source of steel produced in the USA early in the next century.

There is also a similar but lower level contaminated dust which is derived from the other major process for steel manufacturing, the basic oxygen furnace (BOF). The BOF can be either top or bottom blown. Because the levels of toxic metals such as cadmium, lead and zinc are lower, BOF dust is not currently classified by EPA as hazardous.

BOF dust may be considered hazardous in the future and its non-iron contaminants make it difficult to impossible to utilize in current steel manufacture resulting in substantial "stock piles" worldwide.

BOF dust can also be processed by the present invention to recover both the ferrous and non-ferrous values contained therein.

Many other metallurgical dusts also contain metal values which can be recovered and environmental concerns which can benefit from the application of this invention.

Currently EAF dust is disposed of by pyro metallurgical processing, land-filling, stabilization and to a small extent, fertilizer production.

Pyro processing which represents the substantial proportion of all EAF dust treated, costs steel producers from US $150 to US $200 per metric ton. Assuming an average cost of US $175 per metric ton of EAF dust, the annual cash burden on this major essential industry is US $105,000,000 per year. This figure, however, greatly undervalues the true cost to the steel industry, to the public-at-large, and to our descendants from damage to the environment.

None of the known processes in practice totally eliminate economic and environmental waste.

Table 1 gives the average values of the EAF dust constituents for a sample plant for 1992 and 1993. Most notable are the high concentrations of iron (approximately 35%), zinc (approximately 20–23%), lead (approximately 1%), manganese (approximately 3.5%), and magnesium (approximately 2%). The nonferrous values represent potentially rich sources of metal values, such as zinc, lead, copper, cadmium, calcium and magnesium. The iron can be recycled back into the EAF furnace.

TABLE 1

SAMPLE PLANT EAF DUST CONSTITUENTS FOR 1992/1993

| | % Zn | % Al | % Pb | % Fe | % Cd | % Cu | % Mn | % Na | % Ba |
|---|---|---|---|---|---|---|---|---|---|
| Avg. 1992 | 20.3 | 0.27 | 1.27 | 36.0 | 0.02 | 0.16 | 3.54 | 0.59 | 0.01 |
| Avg. 1993 | 22.7 | 0.30 | 1.04 | 34.8 | 0.01 | 0.13 | 3.60 | 0.70 | 0.01 |

| | % CaO | % Cr | % Mg | % Ni | % V | % As | % SiO2 | % Cl |
|---|---|---|---|---|---|---|---|---|
| Avg. 1992 | 5.51 | 0.20 | 2.06 | 0.02 | 0.01 | .0036 | 2.52 | 0.96 |
| Avg. 1993 | 5.48 | 0.20 | 2.48 | 0.13 | 0.02 | .0029 | 4.74 | 0.78 |

There are several problems associated with the disposal or processing of EAF dust. The high level of zinc in the dust is expected by many experts to cause problems with zinc build-up in a furnace if the dust is recycled directly to the furnace. High zinc vapors in the EAF furnace are known to cause shorting of the electrodes causing the electrical energy to be wasted instead of being used for making steel. A high proportion of the zinc in EAF dust is present in the form of ferrites ($ZnO.Fe_2O_3$,) which have proven resistant to presently known leaching processes.

Currently, the steelmaker disposes of the EAF dust by shipping it to a company specializing in waste management, which charges a processing fee of up to $200 per ton of dust. In addition to the processing fee, there are freight costs and substantial potential liability in the over-the-road shipment of this hazardous waste.

The production of 1 ton of steel is generally expected to generate about 34 lbs. (15.4 kg) of EAF dust as a by-product. Therefore, a 100 ton hearth will produce about 3400 lbs. (1542 kg) of EAF dust. A typical EAF hearth produces over 10,000 tons of EAF dust per annum. When a $175 per ton cost is considered, the dust disposal cost for this typical plant is over $1,750,000 per year. Many of the more substantial EAF Steel companies have two, three or four hearths at a single steel complex. Their EAF costs rise proportionally.

DESCRIPTION OF THE PRIOR ART

Applicant is aware of the following U.S. Patents concerning process and apparatus for treating and recycling EAF dust.

| U.S. Pat. No. | Inventor | Issue Date | Title |
| --- | --- | --- | --- |
| 3,849,121 | Burrows | 11-19-1974 | ZINC OXIDE RECOVERY PROCESS |
| 4,332,777 | Pazdej | 06-01-1982 | HYDROMETALLURGICAL TREATMENT OF METALLURGICAL DUST |
| 5,208,004 | Myerson | 05-04-1993 | METHOD FOR THE RECOVERY OF ZINC OXIDE |

Burrows, U.S. Pat. No. 3,849,121, teaches a method for the selective recovery form a number of industrial waste material of various components, including zinc, copper, lead and iron, which comprises the steps of leaching the waste material with an ammonium chloride solution maintained at an elevated temperature, separating the undissolved iron component from solution, treating the solution with zinc metal to displace the copper and lead from the solution, and cooling the solution to precipitate therefrom the zinc component as zinc oxide.

Pazdej, U.S. Pat. No. 4,332,777, teaches a process and apparatus for hydrometallurgical treatment of metallurgical dust by acid leaching followed by a solid-liquid separation. The leaching phase is effected by moderate acid attack (pH at the end of the reaction about 4 or 5) and in which a supplementary solid-liquid separation stage is provided, before the solid-liquid separation or after. The process is applicable to all dusts resulting from treatment of metals, notably ironworking dusts, and particularly those formed in blast furnaces so as to permit the separation and recovery of useful elements contained therein, such as iron, zinc, and lead.

Myerson, U.S. Pat. No. 5,208,004, teaches a method for the recovery of zinc oxide from industrial waste materials of various components, including zinc, lead, iron, and cadmium, which comprises the steps of treating the waste material with an ammonium chloride solution maintained at an elevated temperature, separating the undissolved components from the solutions, treating the solution with zinc metal to displace undesired metal ions from the solution, cooling the solution to precipitate therefrom zinc compounds, washing the precipitated zinc compounds to remove unwanted compounds such as diamino zinc dichloride, and drying the remaining zinc compound which is essentially hydrated zinc oxide, resulting in essentially pure zinc oxide.

None of these inventions dissolve and recover the twenty to sixty percent of the zinc tied up in ferrites and similar insoluble complexes.

SUMMARY OF THE INVENTION

The invention provides a method for totally converting toxic metallurgical dust into marketable products. This invention also provides a method for extracting and recovering the twenty to sixty percent zinc values of EAF dust that has heretofore been unrecoverable.

During normal operation, the EAF dust is dissolved in a nitric acid solution, and iron is precipitated from the solution by raising its pH and/or by elevating the temperature. The dust may first be leached in water. The resulting solution undergoes iron removal then heavy metal removal by electrolytic and/or sulfide precipitation then is evaporated and decomposed. The resulting product is leached in water to remove calcium nitrate. The resulting residue is treated with metal amine complexing agents such as ammonium carbonate, ammonium hydroxides, mixtures thereof and similar agents to recover the zinc values leaving manganese and magnesium values which are separated by acid.

OBJECTS OF THE INVENTION

The principal object of the invention is to provide an improved method of processing EAF dust which converts it totally from toxic waste to usable products.

An additional major object is to provide a process which can be operated at individual dust producing locations eliminating the transportation hazards and potential liabilities incurred in the shipment of hazardous and noxious wastes.

Another object is to provide a process which can be contiguous with EAF and similar metallurgical dust collection so as to eliminate the storage of hazardous waste.

A further object of this invention is to provide a method for removal of zinc, copper, cadmium, lead and other toxic or undesirable elements from EAF dust.

Another object of the invention is to provide a method for the separation of valuable calcium compounds from metallurgical furnace dusts.

Another object of the invention is to provide a method for eliminating existing and future environmental liability.

Another object of the invention is to provide a process for recovering the twenty to sixty percent zinc that current processes cannot obtain.

Another object of the invention is to provide a process for removing sufficient non-ferrous metals such as zinc and lead that the remaining iron residue can be recycled to the furnace without upsetting the required metallurgical balance of the bath and its coexisting vapors in the furnace.

Another object of the invention is to provide a method for the recovery of valuable zinc products from metallurgical furnace dusts.

Another object of the invention is to provide a method for the recovery of marketable magnesium and manganese compounds from metallurgical furnace dusts.

Another object of the invention is to provide a method for the separation of valuable zinc compounds from metallurgical furnace dusts.

Still another object of this invention is to provide an apparatus to carry out this process.

Another object of this invention is to provide a method for the separation and recovery of valuable lead, cadmium, and copper.

BRIEF DESCRIPTION OF THE DRAWINGS

The foregoing and other objects will become more readily apparent by referring to the following detailed description and the appended drawings in which.

DETAILED DESCRIPTION

The invented method of treating metallurgical dust and recovering valuable chemical commodities, comprises the steps of: reacting metallurgical dust in a nitric acid solutions resulting in a nearly complete dissolution of the zinc, cadmium, copper, iron, magnesium, calcium, manganese and lead; precipitating iron from the solution by raising the pH and/or elevating the temperature of the solution; and removing cadmium, copper and lead from the solution in an electrolytic cell, where elemental copper and elemental cadmium are collected at the cathode, and lead dioxide is collected at the anode. Cadmium, copper and lead can also be removed using a sulfide ion source such as hydrogen sulfide ($H_2S$) or sodium bisulfide (NaSH). The nitric acid can be a solution of 10% to 100% nitric acid. Note that solutions of more than 70% nitric acid are more difficult to obtain and work with, so the working range is an aqueous solution of 30% to 70% nitric acid, and the preferred solution is 40% to 60% nitric acid.

Figure 1:
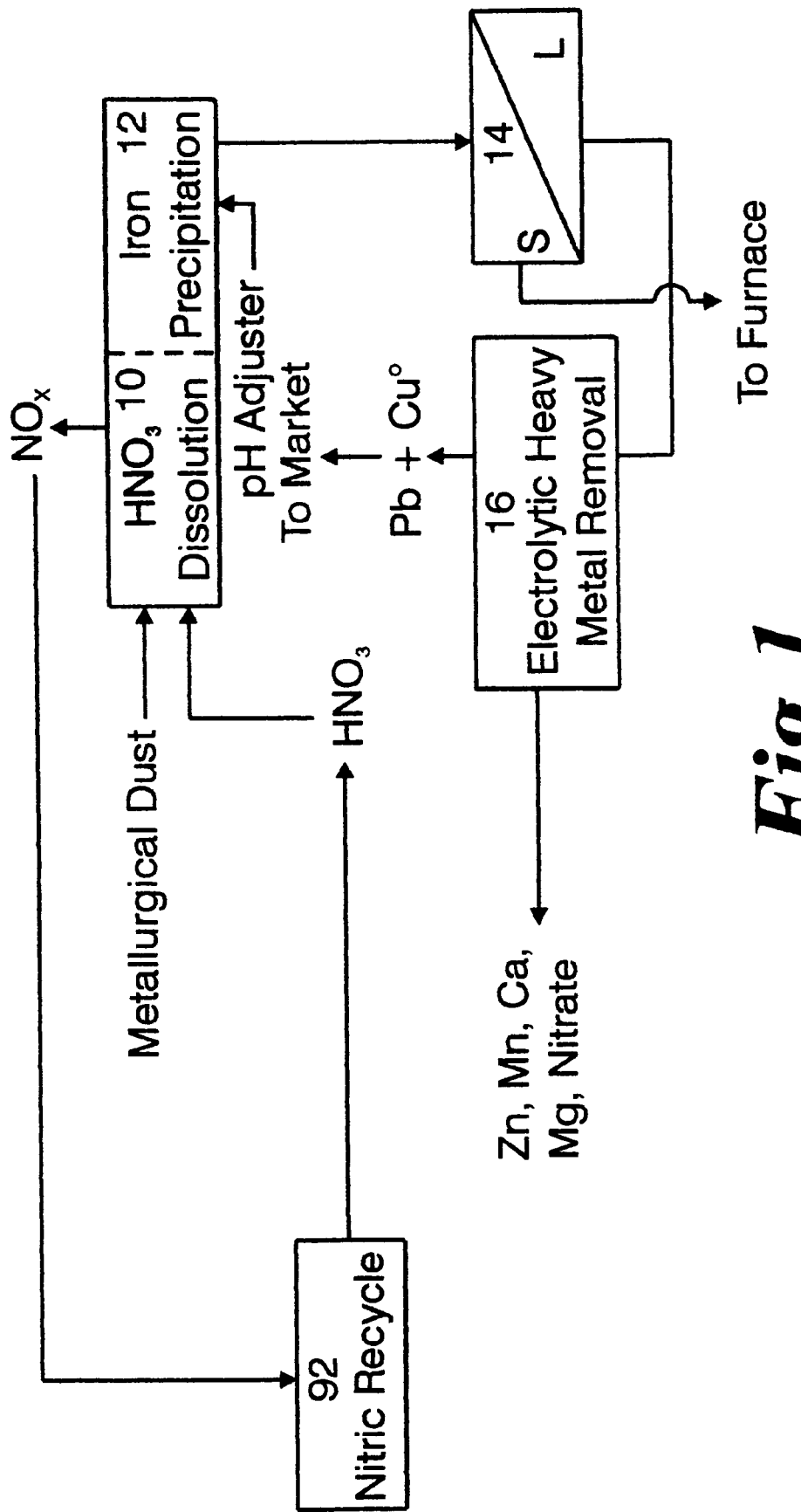
FIG. 1 is a flow chart of the process for treating EAF dust to produce a number of profitable streams of inorganic chemicals.

Referring now to the drawings, and particularly to FIG. 1, metallurgical dust, such as EAF dust is leached with nitric acid in the $HNO_3$ Dissolution Stage 10 where it is leached with nitric acid from the Nitric Recycle 18. $HNO_3$ Dissolution 10 generates NOx which is sent to the Nitric Recycle 18. The $HNO_3$ Dissolution mixture from the $HNO_3$ Dissolution 10 is treated with a basic agent, such as zinc carbonate to cause Iron Precipitation 12. Increasing the temperature increases the iron precipitate. At 200° C. or above, iron can be precipitated by temperature alone. This temperature requires a pressurized reaction vessel and is not therefore the preferred method. The resulting mixture is sent to a filter in filtration stage 14 where the iron oxide solid is separated for use as a feedstock for a steelmaking furnace or chemical applications. The liquid from the filtration stage 14 is sent to a electrolytic heavy metal removal 16 where elemental copper, cadmium and lead are removed at the electrodes. The resulting liquid is free from lead, cadmium, and copper and is suitable for agricultural and similar uses.

It is advantageous to employ a nitric recycle process 18, wherein nitric ($NO_x$) gases exuded during the reacting of nitric acid solution with metallurgical dust are recycled into nitric acid by a nitric recycle process.

Reaction 10 of metallurgical dust with the nitric acid solution takes place at elevated temperatures, within the range of 70° to 130° centigrade (hereinafter C.) or 158° to 266° fahrenheit (hereinafter F.). A range of 95° to 125° C. (203° to 257° F.) yields good results. The mixture of nitric acid solution and metallurgical dust is reacted for a period of one quarter (¼) to four (4) hours, with good results being obtained from reaction periods of one (1) to two (2) hours.

Iron removal 12 from the filtrate is accomplished by raising the pH of the solution from a range of 1 to 2.3 to a range of 1.8 to 3.5. This is accomplished through the introduction of a pH adjuster which, in this case, will be a basic agent. Examples of suitable basic agents include zinc carbonate $ZnCO_3$, zinc oxide $Zn(OH)_2$, or other mixed oxides, though any agent capable of adjusting the pH level can be used. At this same time the solution is heated to about 80° to 130° C. (176° to 266° F.) . The precipitate is separated for use in the furnace, and the resulting filtrate is ready for further processing.

The resulting filtrate is then treated by either electrolysis 16 or by reaction with $H_2S$ or other sulfide ion sources such as NaSH. Cadmium, copper and lead can be collected in an electrolytic cell operated at ambient temperature, and the electrolysis is continued for sufficient time to insure quantitative deposition.

Alternatively if a separate cadmium product is required, electrolysis can be conducted so as to first remove copper and lead by electrolysis and then cadmium as a sulfide concentrate.

Figure 2:
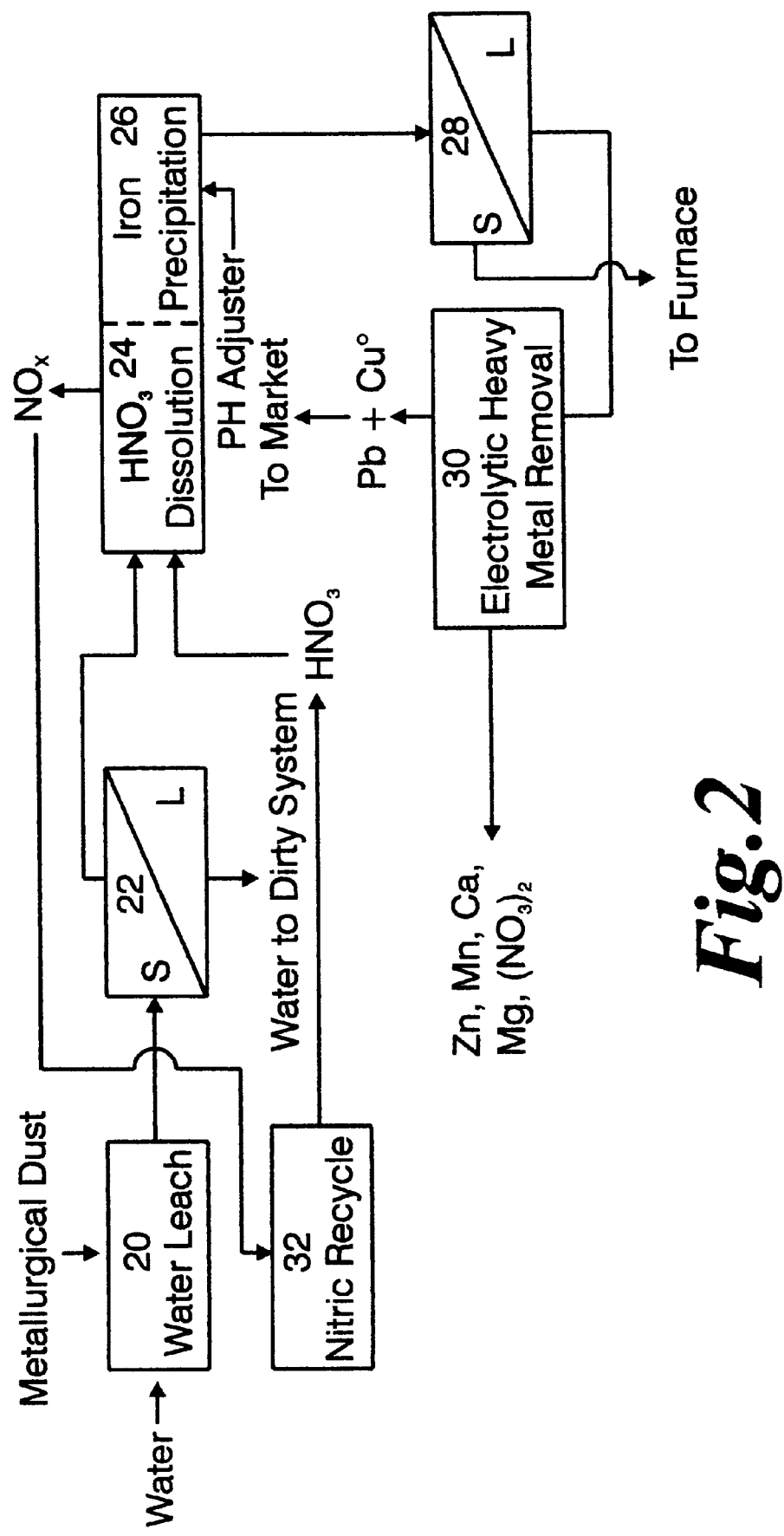
FIG. 2 is an expanded flow chart of FIG. 1 which adds a water leach to help control the corrosiveness of the process and improve the purity of the products.

In many applications, it is desirable to add an initial step 20 of leaching metallurgical dust with water, FIG. 2, creating and separating a filtrate and washed metallurgical dust 22. The filtrate is sent to a water treatment system, leaving washed metallurgical dust residue for reaction with nitric acid solution. This step is quite effective in removing unwanted chloride from the system.

Using the water leach, the metallurgical dust is washed with water to remove chlorides in water leach stage 20, FIG. 2. A resulting mixture is filtered in a first filtration stage 22, and the liquid is sent for processing (which may be the dirty water system of a steel plant). The solid from filtration stage 22 is sent to $HNO_3$ Dissolution 24 where it is leached with nitric acid from the nitric recycle 32. $HNO_3$ Dissolution 24 generates NOx, which is also sent to the nitric recycle 32. The $HNO_3$ Dissolution mixture from the $HNO_3$ Dissolution 24 is treated with a basic agent, such as zinc carbonate, to cause iron precipitation 26. This resulting mixture is sent to a filter in a second filtration stage 28 where the iron oxide solid is separated for use in a steelmaking furnace. The liquid from the second filtration stage 28 is sent to an electrolytic heavy metal removal 30 where elemental copper, cadmium and lead oxide are removed at the electrodes. This produces a heavy metal-free mixed metal nitrate solution which can be marketed.

Figure 3:
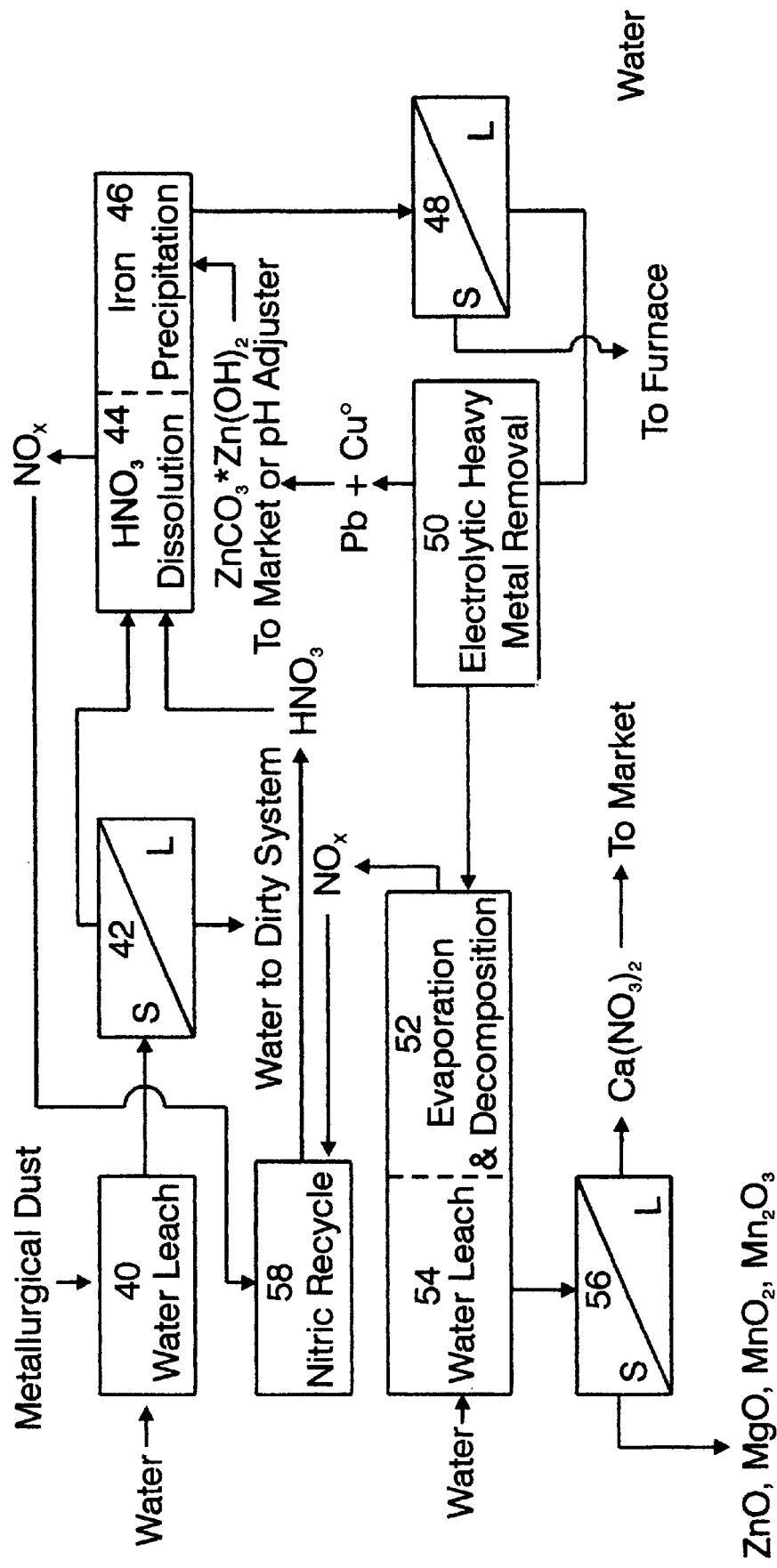
FIG. 3 is an expanded flow chart of FIG. 2 which separates out further chemical products.

A more refined product can be obtained by adding the steps of evaporating and decomposing 52, FIG. 3, the filtrate to obtain a solid residue of metal oxides and calcium nitrate. Evaporating, decomposing and leaching the solid residue with water 54 produces the following products:

$Zn(NO_3)_2$ (aq)=ZnO (s)+$NO_2$ (g)+NO (g)+$O_2$ (g)

$Mn(NO_3)_2$ (aq)=$MnO_2$ (s)+$NO_2$ (g)+NO (g)+(g)

$2Mn(NO_3)_2$ (aq)=$Mn_2O_3$ (s)+2 $NO_2$ (g)+2 NO) (g)+3[O] (g)

$Mg(NO_3)_2$ (aq)=MgO (s)+$NO_2$ (g)+NO (g)+$O_2$ (g) $Ca(NO_3)_2$ (aq)=$Ca(NO_3)_2$ (aq)

A third liquid solid separation 56 extracts aqueous calcium nitrate. Evaporation and decomposition steps can be added either with or without the initial water leach. Evaporating and decomposing 52 the filtrate to obtain metal oxides and calcium nitrate entails heating the filtrate to a temperature range of about 200° to 400° centigrade (392° to 752° F.) for sufficient time to transfer the energy required for evaporation, concentration, and decomposition. Liberated $NO_x$ is then sent to the nitric recycle system 58. Leaching of solid residue with water takes place at ambient temperatures for one-half (½) to two (2) hours (see 54 and 56, FIG. 3).

Figure 4:
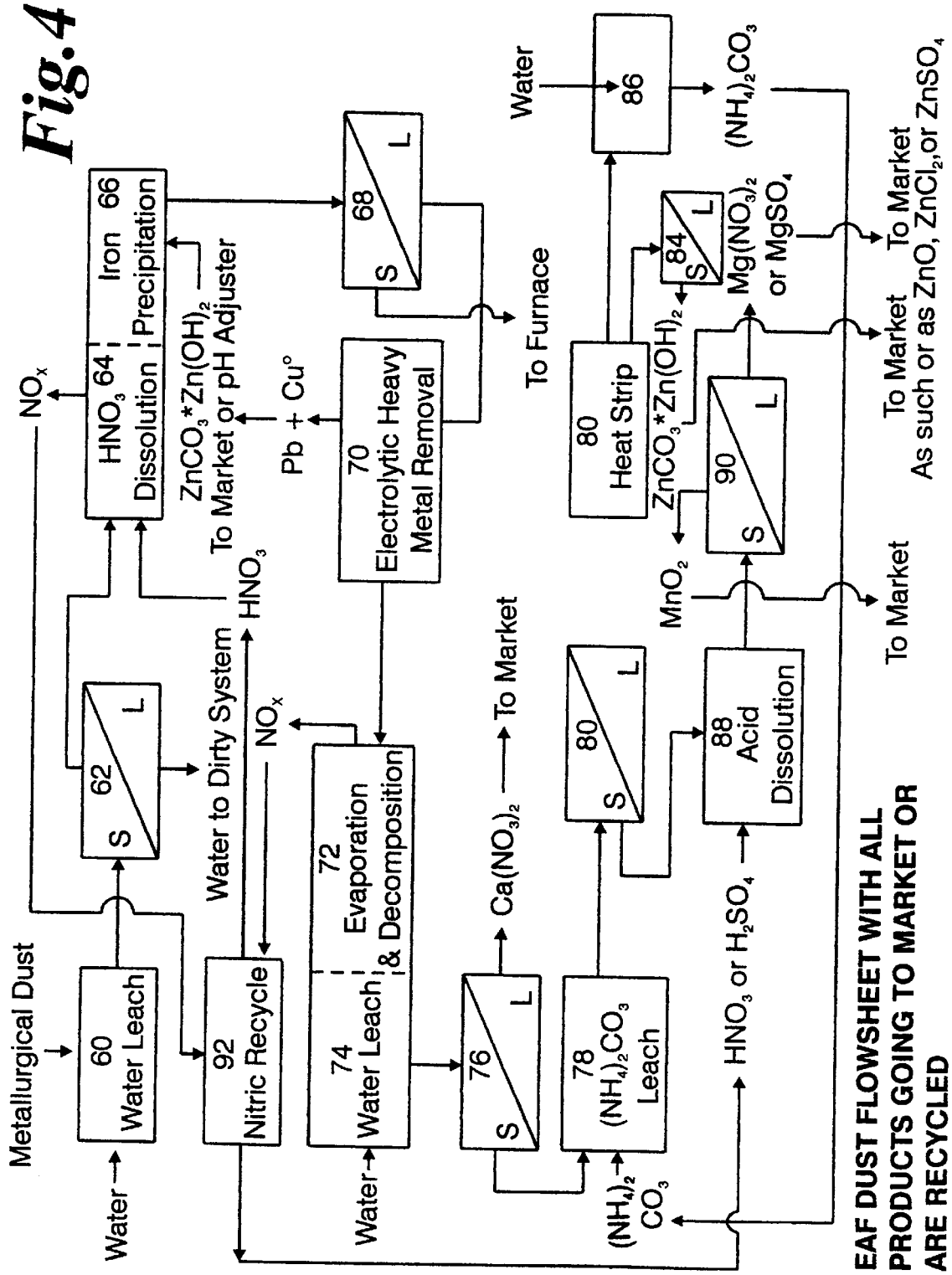
FIG. 4 is a flow chart of the process which enables EAF dust to be optimally utilized to produce a number of profitable streams of inorganic chemicals.

To enhance the value of the residual metals removed from the dust, further separations can be performed. It is possible to separate the zinc from the magnesium and manganese by leaching the precipitate of third separation 56 with aqueous ammonia, ammonia salts or other amine complexing solutions such as ammonium carbonate solution 78, FIG. 4, to solubilize and filter to remove the zinc from the solids and filtrate 80. Stripping the leachate of ammonium carbonate 82 yields zinc precipitated as a zinc oxycarbonate. Leaching the residue with ammonium carbonate solution 78 is carried out at ambient temperatures for one (1) to three (3) hours. Stripping the leachant of the complexing ammonium carbonate solution requires a heat strip 82 to elevate the temperature to 70° to 110° C. (158° to 230° F). These elevated temperatures are maintained for a sufficient time to transfer the energy, required for ammonium carbonate evaporation.

The basic zinc product obtained in the heat strip 82 is divided into a first stream and a second stream. The first stream can serve as a pH adjuster to precipitate iron at 66. The second stream 84 can be used to prepare highly pure zinc products for sale. The zinc complexes come off as a cake or precipitate 84. The acid used to treat the zinc is selected from the group consisting of hydrochloric acid, nitric acid, organic acids, and sulfuric acid.

Referring again to FIG. 4, the invented method includes multiple process steps which enable metallurgical dust (such as EAF dust) to be optimally utilized to produce a number of profitable streams of inorganic chemicals. This process also has a high degree of versatility, in which different chemicals can be made to best exploit the market.

The first step in the invented system is to leach the chloride from the dust with water 60. The leach is performed at ambient temperature for a period of time sufficient to solubilize the majority of the chlorides. For the dusts sampled and the equipment used, this was one half (½) to two (2) hours, with good results achieved from a 1 hour interaction. This leach can be performed at elevated temperatures. The leach can also be performed with various additives such as small amounts of alkali to reduce equipment corrosion or to enhance or restrict the water solubility of the water soluble elements. Results show that over 90% of the chloride is removed in the water leach. This leach necessitates a second separation step 62 from which the leachant is sent to a dirty water system.

The third step is to react the washed dust in a 30% to 70% nitric acid solution 64. Higher and lower nitric acid concentrations can be used but they are either much more costly or slower, respectively. Good results are achieved with a 40% to 60% nitric acid solution. The reaction step is normally performed at 90° to 130° C. which is 194° to 266° F. A range of 100° to 120° C. (212° to 248° F.) is optimal. This elevated temperature should be maintained over a time period sufficient to solubilize the nonferrous metals contained in the dust. For the dusts sampled and the equipment used, this was from one half (½) to three (3) hours. A range of one (1) to two (2) hours is optimal, as good results can be achieved at 1.5 hours. The result is the essentially quantitative dissolution of the zinc (100 percent can be obtained), cadmium, copper, magnesium, calcium, manganese and lead. Unexpectedly, the insoluble zincs such as zinc ferrite were totally decomposed by nitric, and up to 100% of the zinc is recovered for sale. Nitric fumes exuded during this third step 64 are recovered as nitric acid by a nitric recycle process 92.

The fourth step 66 is to remove the iron from the second step 62 filtrate by raising the pH with basic zinc oxycarbonate 66 taken from the end of the process 84. Other alkaline sources, such as limestone ($CaCO_3$), magnesium carbonate ($MgCO_3$), magnesite or magnesium oxide (MgO), magnesium hydroxide ($Mg(OH)_2$), sodium carbonate ($NaCO_3$), sodium hydroxide (NaOH), potassium hydroxide (KOH), ammonium hydroxide or carbonate, zinc oxide (ZnO), lime (CaO), shaken lime $Ca(OH)_2$, or dolomite ($MgCO_3.CaCO_3$) could be used. For the samples tested, the step is performed within the range of 80° to 100° C. (176° to 212° F.), with a temperature of 90° C. yielding good results, for a period of one (1) to three (3) hours, 2 hours yields good results. The precipitation of iron 66 is virtually complete. The iron oxide precipitate 68 can be sent to the furnace as iron ore. The zinc reagent accumulates with the zinc already in the filtrate to be recovered later in the process. Other alkaline reagents, when used, are also recovered in subsequent processing steps.

The sixth step is to remove the cadmium, copper and lead in an electrolytic cell 70 or with $H_2S$ or other sulfides. Using electrolysis, one needs sufficient Faradays to deposit (remove) the copper, cadmium, and lead. For the equipment and quantity of materials preset in our tests, this step was performed at ambient temperature to 100° C. (212° F.) for one half (½) to two (2) hours, 1 hour providing good results. Elemental copper and elemental cadmium are collected at the cathode as:

Cu—copper metal

Cd—cadmium metal.

Lead is collected at the anode.

Removal of these metals is virtually complete, and the filtrate entering the next step is free of lead, cadmium and copper. It is comprised of:

$Zn(NO_3)_2$ (aq)

$Mn(NO_3)_2$ (aq)

$Ca(NO_3)_2$ (aq)

$Mg(NO_3)_2$ (aq).

The seventh step is to evaporate and decompose the filtrate 72 to obtain metal oxides. This step is performed by raising the temperature from 200° to 400° C. (392° to 752° F.), 400° C. (752° F.) being optimal, for a period of 4 to 6 hours, 5 hours being optimal. At this temperature, the zinc, magnesium and manganese form water insoluble oxides, while the calcium remains as a water-soluble nitrate. The nitric gases given off during the evaporation and decomposition 72 are recycled to nitric acid by the nitric recycle 92. If the calcium content is such that it is desired in the oxide mixture, the mixed nitrates can be decomposed at temperature above 500° C. to deposit all of them together.

The calcium nitrate is separated in a marketable form by leaching the solid residue with water 74. This leach is carried out at ambient temperature for a period of one half (½) to two (2) hours, 1 hour being optimal. A precipitate and filtrate 76 are the products of the water leach. Calcium nitrate is recovered as the filtrate and can be sold as such or used to manufacture other chemicals. If the calcium content is low, this step may not be required.

Depending on the input level of the metallurgical dusts being treated, the metal oxides obtained may be found to be of sufficient purity to be used as a crude zinc oxide suitable for refining to metal or for chemical manufacture.

The tenth step is to remove the zinc from the magnesium and manganese by leaching the residue with ammonium carbonate solution 78. For the materials being tested and the amount used, this leach is carried out at ambient temperature for a period of one (1) to three (3) hours, two (2) hours being optimal. Since none of the zinc is now in ferrite form, the leach quantitatively removes the zinc. Ammonia salts will effectively extract and recover the zinc. After separation from the insolubilized magnesium and manganese 80, the filtrate is stripped of the ammonium carbonate (which is recycled) by heating at 70° to 110° C. (158° to 230° F.) with a heat strip 82. A temperature range of 80° to 100° C. (176° to 212° F.) is optimal, for a period of one (1) to three (3) hours (2 hours being optimal) to yield zinc precipitated as a zinc oxycarbonate.

The zinc oxycarbonate obtained in the heat strip is divided into two streams. One stream is sent back to the beginning of the process (step four—iron precipitation 66), where it is used as a pH adjuster to precipitate iron. The other stream 84 can be used to prepare highly pure zinc products for sale.

The solids containing the magnesium and manganese are separated by dissolving the magnesium in either sulfuric or nitric acid 88. This can be performed at ambient temperature for one half (½) to two (2) hours. The liquid filtrate 90 contains marketable magnesium nitrate or sulfate.

This invention results in a thorough utilization of the metallurgical dust, such as EAF dust.

An apparatus for treating metallurgical dust and recovering valuable chemical commodities, comprises: a source of metallurgical dust, which may be from an electric arc furnace (EAF) or a BOF furnace or some other metallurgical source; a source of water, which may either be city water or deionized (DI) water; a nitric acid recycle system; and a vessel is in communication with the source of metallurgical dust and the source of water providing a means for leaching chloride from the dust with water to create a washed metallurgical dust. The same vessel or a second vessel is provided as a means for separating a residue with the filtrate. Filtrate is removed from this stage to a dirty water system and the resulting residue is collected for further processing. A third vessel is provided, in communication with said washed metallurgical dust, as a means for reacting the washed metallurgical dust in a nitric acid solution. The nitric acid solution is provided by the nitric acid recycle system which is in communication with the third vessel. Nitric fumes exuded during this step are recycled into nitric acid by said nitric acid recycle system.

The mixture of nitric acid and washed metallurgical dust is then transferred to a fourth vessel. This vessel also has a input for the addition of a basic or neutralized substance which is a means for removing iron from the mixture by raising pH in said system. This basic substance can be a zinc oxycarbonate produced at step 84, FIG. 4, of the process. This mixture can optionally be sent to a fifth vessel for separation or the separation may take place in vessel four. The resulting iron oxide precipitate can be sent to the furnace as iron ore.

The zinc reagent goes with the zinc already in the filtrate to be recovered later in the process. This filtrate is then sent to a sixth vessel a means for removing cadmium, copper and lead is introduced. This may either be a reaction with $H_2S$ or other heavy metal precipitation regents or the introduction of an electrolytic cell apparatus.

The filtrate entering the next step is free of lead, cadmium and copper and is introduced into a seventh heated vessel for evaporating and decomposing the filtrate to obtain metal oxides and anhydrous calcium nitrate, the nitric gases given off during the evaporation and decomposition are recycled to nitric acid by the nitric recycle.

The resulting metal oxides are introduced into an eighth vessel along with water and leached. This results in a filtrate, calcium nitrate in a marketable form, and a precipitate or cake.

A ninth vessel is provided where the precipitate is mixed with an ammonium carbonate solution. This leach is a means for removing the zinc from the magnesium and manganese. Residue is conveyed to a tenth vessel, filtrate is conveyed to a heat strip which liberates the ammonium carbonate from a zinc precipitate. This Zinc precipitate is zinc oxycarbonate.

A mechanical separator divides the zinc oxycarbonate obtained in the heat strip into a first stream and a second stream. The first stream serves as a pH adjuster to precipitate iron. The second stream is used to prepare a highly pure zinc products for sale. Here the zinc complex is reacted with acid to)produce a zinc product.

In the tenth vessel, the precipitate is mixed with either sulfuric or nitric acid and allowed to separate into a filtrate and a precipitate. The resulting residue is separated out which contains the manganese dioxide. The liquid filtrate contains marketable magnesium as a salt such as nitrate or sulfate.

The advantages of the present invention include the complete recycle of iron to the furnace and sale of all other materials, and the great operational and environmental advantages. Further the present invention is unique in that it can be completely carried out at atmospheric pressures as opposed to elevated pressures.

ALTERNATIVE EMBODIMENTS

While it has been suggested that this process and apparatus can be used effectively on metallurgical dust such as EAF dust, it will be readily apparent to one of ordinary skill in the art that this process can be used on any materials which contain some or all of the following materials: zinc; lead, cadmium; copper; manganese; calcium; and magnesium.

EXAMPLES

Example 1

PRELEACH OF DUST WITH WATER

A quantity of 4530 grams (hereinafter g) of water was heated to 60° C. and agitated in a stainless steel reactor. A quantity of 906 g of EAF dust was added and agitation at 60° C. was maintained for 1 hour. The mixture was filtered and the residue was washed by repulping with 60° C. water. This produced the following results:

| PERCENT EXTRACTED FROM EAF DUST | | | | | | | | | |
|---|---|---|---|---|---|---|---|---|---|
| Al | Ca | Cd | Cu | Fe | Mg | Mn | Pb | Zn | Cl |
| 2.2 | 7.0 | 0.2 | 0.4 | 0.0 | 0.1 | 0.0 | 15.1 | 0.0 | 93.4 |

The preleach with water removed the bulk of chloride while little of the valuable metals were removed from the EAF dust.

Example 2

NITRIC ACID LEACH OF WASHED DUST

A 3 liter agitated reactor was charged with 1200 g of 53% $HNO_3$. A quantity of 400.0 g of washed dust were fed into the reactor over 75 minutes. The temperature was raised to 94° C. and the solution was agitated for another 30 minutes. The solution was filtered and the residue was repulped with pH 2.5 water. This produced the following results:

| PERCENT EXTRACTED FROM WASHED DUST | | | | | | | | | |
|---|---|---|---|---|---|---|---|---|---|
| Al | Ca | Cd | Cr | Cu | Fe | Mg | Mn | Pb | Zn |
| 97.3 | 99.8 | 97.2 | 91.0 | 94.9 | 89.1 | 98.5 | 96.3 | 99.4 | 98.4 |

The nitric acid leach solubilized the majority of the metal values from the EAF dust. Other elements, such as arsenic, would have also been solubilized if they were present. The remaining residue, if any, is totally acceptable for direct recycle to the EAF furnace.

Example 3

IRON PRECIPITATION

A 3 liter agitated reactor was charged with 1l of leachate. The mixture was brought to 90° C. A slurry of 30% calcium carbonate (or, alternately, 20% ZnO or basic zinc carbonate) was added until the pH was raised to 2.2. The resulting precipitate was allowed to settle and the precipitated iron was separated from the solution by filtration. This produced the following results:

| Ref. No. | 611 | 628 | 729 | 740 | 750 | 757 |
|---|---|---|---|---|---|---|
| % Iron Removed | 100 | 99.7 | 99.9 | 99.8 | 99.9 | 100.0 |

Example 4

HEAVY METAL REMOVAL 100 ml of iron-free leachate is electrolyzed at 3.5 volts and 3.4 amp at 90° C. for 15 minutes. (Ref. 768).

| Al | Ca | Cd | Cr | Cu | Fe | Mg | Mn | Pb | Zn |
|---|---|---|---|---|---|---|---|---|---|
| PERCENTAGE PRECIPITATED ||||||||||
| 58.5 | 11.0 | 99.9 | | | 0.0 | | | 99.5 | 0.0 |
| GRAMS PRECIPITATED ||||||||||
| .0034 | .0003 | 0.0194 | | | 0 | | | .1310 | 0 |

Example 5

EVAPORATION AND DECOMPOSITION

A quantity of 950 ml of iron free and heavy metal free leachate was placed in a 1l beaker and evaporated down to a concentrated solution on a hot plate. The concentrated solution was transferred into a 2l glass reactor with a stirrer and was heated with stirring to evaporate and decompose the solids. After 235 minutes NOx ceased evolving from the reaction. The solids were allowed to cool. This produced the following results:

| PERCENTAGE OF SOLIDS ||||| 
|---|---|---|---|---|
| Al | Ca | Cd | Cr | Cu |
| .140 | 5.868 | .017 | .008 | .057 |
| Fe | Mg | Mn | Pb | Zn |
| .034 | 2.323 | 1.600 | .369 | 60.085 |

Example 6

WATER EXTRACTION OF DECOMPOSED RESIDUE

A quantity of 360 g of distilled water was charged into a 600 ml beaker. The water was agitated and 180 g of decomposition residue was added. After 60 minutes of extracting, the solution was filtered. This produced the following results:

| PERCENTAGE EXTRACTED FROM DECOMPOSITION RESIDUE ||||||||||
|---|---|---|---|---|---|---|---|---|---|
| Al | Ca | Cd | Cr | Cu | Fe | Mg | Mn | Pb | Zn |
| 23.1 | 90.5 | 3.5 | | | 2.4 | 0.1 | 0.0 | | 0.0 |

The percentages are for the extraction of the materials present in the decomposition residue. They have no bearing for the magnitude of these materials in the residue, only for their percent removal.

Example 7

AMMONIUM CARBONATE EXTRACTION OF WASHED RESIDUE

A quantity of 524 g of 50% ammonium carbonate was charged into an agitated 100 ml beaker. A quantity of 131 g of residue was added and allowed to mix for 120 minutes at room temperature during which time hydrogen peroxide was added. The solution was filtered and the residue washed with 1% ammonia. This produced the following results:

| PERCENTAGE EXTRACTED BY AMMONIUM CARBONATE ||||||||||
|---|---|---|---|---|---|---|---|---|---|
| Al | Ca | Cd | Cr | Cu | Fe | Mg | Mn | Pb | Zn |
| 10.2 | 11.5 | 86.2 | nil | nil | 6.3 | 0.9 | 0.3 | nil | 94.9 |

These figures are the percent removal of the materials present in washed residue.

Example 8

AMMONIUM CARBONATE STRIPPING

A quantity of 450g of ammonium carbonate leachate was charged into a 500 ml round bottomed flask. The solution was heated to boiling to strip off the ammonia. As the solution level got low distilled water was added. This procedure was continued until only a faint odor of ammonia remained. The solution was then filtered and the solid was scraped from the bottom of the flask. This produced the following results:

| RESULTING PRODUCTS ||||||||||
|---|---|---|---|---|---|---|---|---|---|
| Al | Ca | Cd | Cr | Cu | Fe | Mg | Mn | Pb | Zn |
| .006 | .183 | 0.01 | .011 | .001 | .004 | .037 | .005 | .001 | 68.552 |

Example 9

DISSOLUTION OF AMMONIUM CARBONATE LEACH RESIDUE

A quantity of 400 g of 50% $HNO_3$ was charged into as 600 ml beaker. A quantity of 100 g of ammonium carbonate leach residue was added and the mixture was agitated for 30 minutes. The solution was filtered through glass fiber filter paper. This produced the following results:

| PERCENTAGE IN RESIDUE |||||
|---|---|---|---|---|
| Al | Ca | Cd | Cr | Cu |
| .427 | .381 | .005 | .060 | .007 |
| Fe | Mg | Mn | Pb | Zn |
| .194 | 2.469 | 57.404 | .016 | 6.931 |

The filtrate contains 14.2 g/l of Mg and 7.9 g/l of Zn.

Example 10

PRODUCTION OF ZINC SULFATE SOLUTION FROM ZINC CARBONATE

A quantity of 300 ml of distilled water was added into an agitated 1l beaker. A quantity of 70 g of ammonium carbonate heat strip residue was added along with 69 g of 97% $H_2SO_4$. The solution was diluted to 900 g with distilled water and the pH was adjusted to 2.0 with zinc carbonate. The mixture was diluted to 100 g to make a 20% $ZnSO_4.7H_2O$ solution. This produced the following results:

| GRAMS PER LITER IN SOLUTION | | | | |
|---|---|---|---|---|
| Al | Ca | Cd | Cr | Cu |
| 0.35 | .086 | .014 | .011 | .002 |
| Fe | Mg | Mn | Pb | Zn |
| .002 | .113 | .005 | .003 | 51.927 |

SUMMARY OF THE ACHIEVEMENT OF THE OBJECTS OF THE INVENTION

From the foregoing, it is readily apparent that we have invented an improved method and apparatus for treatment of EAF dust and recovery of marketable products which is faster and more economical than heretofore has been possible. This process provides a method of removal of copper, cadmium and lead dioxide as well as separation of marketable calcium nitrate. Marketable zinc products, magnesium and manganese compounds are some of the valuable byproducts of the process as is high purity zinc sulfate. Yet, this process can be operated at individual dust producing locations, eliminating the need for transportation of hazardous waste and potential liabilities incurred in the shipment of hazardous and noxious wastes. This process, which can be contiguous with EAF and similar metallurgical dust collection, eliminates the storage of hazardous waste which helps eliminating existing and future environmental liability. Valuable calcium nitrates are separated from metallurgical furnace dusts using this process.

While other processes exist which recover zinc, the present invention obtains the twenty to sixty percent zinc that current processes cannot obtain. By removing sufficient non-ferrous metals, such as zinc and lead, allows the remaining iron residue to be recycled to the furnace without upsetting the required metallurgical balance of the bath and its coexisting vapors in the furnace. Valuable zinc products (e.g. high purity zinc sulfate and zinc chloride, zinc nitrate and other valuable zinc compounds) are obtained from the metallurgical furnace dusts as are marketable magnesium and manganese compounds.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of treating metallurgical dust and recovering valuable chemical commodities, comprising the steps of:
   a. leaching said dust with water to remove chlorides, and filtering to remove water and create a washed metallurgical dust;
   b. reacting said washed metallurgical dust in a nitric acid solution resulting in dissolving the zinc, cadmium, copper, magnesium, calcium, manganese and lead into the filtrate;
   c. precipitating iron from the step b filtrate solution by raising the pH of the solution;
   d. removing cadmium, copper and lead;
   e. evaporating and decomposing the filtrate to obtain a solid residue of metal oxides and calcium nitrate;
   f. leaching the solid residue with water and separating calcium nitrate in a marketable form;
   g. separating the zinc from the magnesium and manganese by leaching the residue with ammonium carbonate solution to form a cake and filtrate; and
   h. stripping the filtrate of step g of ammonium carbonate to yield zinc precipitated as a zinc oxycarbonate.

2. The method of treating metallurgical dust and recovering valuable chemical commodities according to claim 1, wherein said metallurgical dust is from an electric arc furnace.

3. The method of treating metallurgical dust and recovering valuable chemical commodities according to claim 1, wherein said metallurgical dust is from an Basic Oxygen Furnace.

4. A method according to claim 1 wherein the nitric fumes exuded during step (b) are recycled into nitric acid by a nitric recycle process.

5. A method according to claim 1 wherein the pH of the solution in step (c) is raised by the addition of basic zinc carbonate.

6. A method according to claim 5 further comprising the zinc reagent being removed along with the zinc already in the filtrate to be recovered later.

7. A method according to claim 1 wherein removing copper, cadmium and lead is performed by an electrolytic cell, where elemental copper and elemental cadmium are collected at a cathode, and lead is collected at an anode, resulting filtrate being free of lead, cadmium and copper.

8. The method according to claim 1, wherein removing cadmium, copper and lead is performed by a reaction between liquid from filtration and a sulfide ion source.

9. The method of treating metallurgical dust and recovering valuable chemical commodities according to claim 7, wherein said sulfide ion source is selected from the group consisting of $H_2S$, NaSH and combinations thereof.

10. The method of treating metallurgical dust and recovering valuable chemical commodities according to claim 7, wherein removing cadmium, copper and lead in an electrolytic cell is from ambient temperature to 100° C. (212° F).

11. The method of treating metallurgical dust and recovering valuable chemical commodities according to claim 7, wherein removing cadmium, copper and lead in an electrolytic cell is performed for sufficient time for quantitative deposition.

12. A method according to claim 1 wherein nitric gases given off during the evaporation and decomposition of step (e) are recycled to nitric acid by a nitric recycle process.

13. The method of treating metallurgical dust and recovering valuable chemical commodities according to claim 1, further comprising the steps of:
   i. dividing the zinc oxycarbonate obtained in the heat strip into a first stream and a second stream, said first stream serves as a pH adjuster to precipitate iron, said second stream prepares pure zinc products by reacting a zinc compound with acid to produce a zinc product; and
   j. separating a residue containing magnesium and manganese by treating said residue in acid.

14. The method of treating metallurgical dust and recovering valuable chemical commodities according to claim 12, wherein said acid of step i is selected from the group consisting of hydrochloric acid, nitric acid, organic acids, and sulfuric acid.

15. The method of treating metallurgical dust and recovering valuable chemical commodities according to claim 13, wherein acid of step j is selected from the group consisting of hydrochloric acid, nitric acid, and sulfuric acid.

16. A method of treating metallurgical dust and recovering valuable chemical commodities whereby separation and recovery of all economically valuable and environmentally toxic metals is achieved in a marketable or environmentally acceptable form, comprising the steps of:
   a. reacting metallurgical dust in a nitric acid solution, resulting in a nearly complete dissolution of zinc, cadmium, copper, magnesium, calcium, manganese and lead;
   b. precipitating iron from the solution by raising the pH of the solution to a pH range of 1.8 to 3.5; and
   c. removing cadmium, copper and lead;
   wherein removing cadmium, copper and lead is performed by an electrolytic cell, where elemental copper and elemental cadmium are collected at a cathode, and lead at an anode.

17. The method of treating metallurgical dust and recovering valuable chemical commodities according to claim 16, wherein removing cadmium, copper and lead in an electrolytic cell is performed from ambient temperature to 100° C. (212° F).

18. The method of treating metallurgical dust and recovering valuable chemical commodities according to claim 16, wherein removing cadmium, copper and lead in an electrolytic cell is performed for sufficient time for quantitative deposition.

19. The method of treating metallurgical dust and recovering valuable chemical commodities according to claim 16, wherein copper and lead are first removed by electrolysis and cadmium recovered separately by precipitating cadmium with a sulfide.

20. A method of treating metallurgical dust and recovering valuable chemical commodities whereby separation and recovery of all economically valuable and environmentally toxic metals is achieved in a marketable or environmentally acceptable form, comprising the steps of:
   a. reacting metallurgical dust in a nitric acid solution, resulting in a nearly complete dissolution of zinc, cadmium, copper, magnesium, calcium, manganese and lead;
   b. precipitating iron from the solution by raising the pH of the solution to a pH range of 1.8 to 3.5;
   c. removing cadmium, copper and lead;
   d. evaporating and decomposing the solution to obtain a solid residue of metal oxides and calcium nitrate; and
   e. leaching the solid residue with water and separating calcium nitrate therefrom in a marketable form.

21. A method according to claim 20 wherein nitric fumes exuded during step (d) are recycled into nitric acid by means of a nitric recycling process.

22. The method of treating metallurgical dust and recovering valuable chemical commodities according to claim 20, wherein said evaporating and decomposing the filtrate to obtain metal oxides and calcium nitrate comprises heating said filtrate to a range of about 200° to 400° centigrade (392° to 752° F.).

23. The method of treating metallurgical dust and recovering valuable chemical commodities according to claim 22, wherein said evaporating and decomposing the filtrate to obtain metal oxides and calcium nitrate further comprises heating said filtrate for sufficient time to transfer energy required for decomposition.

24. The method of treating metallurgical dust and recovering valuable chemical commodities according to claim 21, wherein said leaching of solid residue with water takes place at ambient temperatures.

25. The method of treating metallurgical dust and recovering valuable chemical commodities according to claim 24, wherein said leaching of solid residue with water continues until a majority of water soluble chloride has been extracted.

26. The method of treating metallurgical dust and recovering valuable chemical commodities according to claim 20, further comprising an initial step of leaching metallurgical dust with water creating and separating a filtrate and washed metallurgical dust, filtrate is sent to a water treatment system, leaving washed metallurgical dust residue for reaction with nitric acid solution.

27. A method according to claim 26 wherein nitric fumes exuded during step (d) are recycled into nitric acid by a nitric recycling process.

28. The method of treating metallurgical dust and recovering valuable chemical commodities according to claim 26, wherein the step of evaporating and decomposing the filtrate to obtain metal oxides and calcium nitrate, comprises heating said filtrate a temperature range of about to 200° to 400° centigrade (392° to 752° F.).

29. The method of treating metallurgical dust and recovering valuable chemical commodities according to claim 28, wherein the step of evaporating and decomposing the filtrate to obtain metal oxides and calcium nitrate further comprises heating said filtrate for sufficient time to transfer energy required for decomposition.

30. The method of treating metallurgical dust and recovering valuable chemical commodities according to claim 26, wherein leaching of solid residue with water takes place at ambient temperatures.

31. The method of treating metallurgical dust and recovering valuable chemical commodities according to claim 30, wherein leaching of solid residue with water continues until a majority of water soluble chloride has been extracted.

32. The method of treating metallurgical dust and recovering valuable chemical commodities according to claim 26, further comprising the steps of:
   f. separating zinc from magnesium and manganese by leaching the residue with an ammonium hydroxide/ammonium carbonate solution to form a cake and filtrate; and
   g. stripping the filtrate (of step f) of ammonium compounds to yield zinc precipitated as a zinc oxycarbonate.

33. The method of treating metallurgical dust and recovering valuable chemical commodities according to claim 32, wherein said ammonium compound is selected from the group consisting of ammonium hydroxide, ammonium carbonate and combinations thereof.

34. The method of treating metallurgical dust and recovering valuable chemical commodities according to claim 32, wherein said ammonium compound is selected from the group consisting of ammonium chloride, other metal amine complexing agents and combinations thereof.

35. The method of treating metallurgical dust and recovering valuable chemical commodities according to claim 32, wherein leaching the residue with ammonium compound solution takes place at ambient temperatures.

36. The method of treating metallurgical dust and recovering valuable chemical commodities according to claim 35, wherein leaching the residue with ammonium compound solution unit all amine soluble zinc has been dissolved.

37. The method of treating metallurgical dust and recovering valuable chemical commodities according to claim 32, wherein stripping the filtrate of ammonium compound solution takes place at 70° to 110° centigrade (158° to 230° F.).

38. The method of treating metallurgical dust and recovering valuable chemical commodities according to claim 37, wherein leaching the residue with ammonium carbonate solution lasts for sufficient time to dissolve the zinc portion of the residue.

39. The method of treating metallurgical dust and recovering valuable chemical commodities according to claim 32, further comprising the steps of:

h. dividing the zinc oxycarbonate obtained in the heat strip into a first stream and a second stream, said first stream serves as a pH adjuster to precipitate iron, said second stream prepares pure zinc products for sale, by reacting a zinc compound with acid to produce a zinc product; and i. separating a residue containing magnesium and manganese by treating said residue with acid.

40. The method of treating metallurgical dust and recovering valuable chemical commodities according to claim 39, wherein said acid of step h is selected from the group consisting of hydrochloric acid, nitric acid, organic acids and sulfuric acid.

41. The method of treating metallurgical dust and recovering valuable chemical commodities according to claim 39, wherein the zinc product of step h is a member of the group consisting of zinc chloride, zinc nitrate, zinc sulfate, zinc oxide, and/or zinc organics such as zinc acetate.

42. The method of treating metallurgical dust and recovering valuable chemical commodities according to claim 39, wherein acid of step i is selected from the group consisting of hydrochloric acid, nitric acid, and sulfuric acid.

43. The method of treating metallurgical dust and recovering valuable chemical commodities according to claim 38, wherein said ammonium compound fumes exuded during this step are recycled ammonium carbonate by an ammonium carbonate recycle process.

* * * * *